United States Patent [19]
Fox

[11] Patent Number: 6,151,700
[45] Date of Patent: Nov. 21, 2000

[54] OBJECT ORIENTED DISTRIBUTED PROGRAMMING SYSTEM FOR COMPUTER CONTROLLED NETWORKS WITH SELECTIVE CAPTURE OF PROGRAM PROPERTY DATA IDENTIFYING A PARTICULAR PROGRAM VERSION

[75] Inventor: Otis Otto Fox, Austin, Tex.

[73] Assignee: International Business Machines Corporation, Armonk, N.Y.

[21] Appl. No.: 08/954,650

[22] Filed: Oct. 20, 1997

[51] Int. Cl.[7] .................................................. G06F 9/44
[52] U.S. Cl. ................... 717/3; 717/1; 701/203; 701/524; 701/511; 701/513; 345/333
[58] Field of Search .................................. 395/703, 701, 395/704, 712, 710; 707/203, 10, 102–104, 511–513, 524; 345/326, 329, 333, 339, 961, 968, 977; 717/3, 1

[56] References Cited

U.S. PATENT DOCUMENTS

| | | | |
|---|---|---|---|
| 5,133,075 | 7/1992 | Risch ...................................... | 707/201 |
| 5,315,703 | 5/1994 | Matheny et al. ......................... | 345/507 |
| 5,367,633 | 11/1994 | Matheny et al. ......................... | 345/514 |

(List continued on next page.)

OTHER PUBLICATIONS

Alden DeSoto, "Using the Beans Development Kit 1.0" A Tutorial, JavaSoft, pp. i—6–2, Sep. 1997.

Barbara White et al, "Using JavaBeans," Special Edition, excerpt of Table of Contents; Chapter 9, pp. 200–228; Appendix A & B, Jul. 1997.

Mark Johnson, "'Keep listening for upcoming events,' How to wire JavaBeans together using 'event listeners'," printed from Javaworld.com Web Site, pp. 1–17, Oct. 1997.

Mark Johnson, "'Double Shot, Haft Decaf, Skinny Latte,'— Customize your Java," printed from Javaworld.com Web site, pp. 1–14, Sep. 1997.

Mark Johnson, "The BeanBox: Sun's JavaBeans test container," printed from javaworld.com Web site, pp. 1–8, Sep. 1997.

Mark Johnson, "A walking tour of JavaBeans," printed from javaworld.com Web site, pp. 1–8, Aug. 1997.

"Manipulating Events in the BeansBox," printed from java-soft.com/docs.books/tutorial/javabeans Web site, pp. 1–5, Undated.

"Using the BeanBox," printed from javasoft.com/docs/books/tutorial/javabeans Web site, pp. 1–8, Undated.

Mike Ricciuti, "Short Take: Sun posts JavaBeans tools," printed from news.com/News/Item Web site, 1 page, Oct. 1997.

"IBM Ships Developer Tools for Building Java Solutions for the Enterprise," printed from software.ibm.com/news Web site, pp. 1–3, Jul. 1997.

*Primary Examiner*—Tariq R. Hafiz
*Assistant Examiner*—Tuan Q. Dam
*Attorney, Agent, or Firm*—Jerry B. Kraft; David A. Mims

[57] ABSTRACT

A computer controlled object oriented programming system for distributive program development over networks such as the internet with means for interfacing a plurality of programming objects with each other to provide combination objects combining programming functions of said objects, each object including predetermined interface data defining a required common interface with the other programming objects as well as a framework of events and attributes and methods for manipulating the attributes. These objects may be combined with each other via their common interfaces to form combination objects, and such combination objects may in turn be further combined with other objects and combination objects to form objects of increasing complexity which function as program routine versions. The combined objects have means for detecting the occurrence of predefined combined programming functions and means responsive to such detection for recording data indicating the program version having the predefined programming functions.

30 Claims, 5 Drawing Sheets

U.S. PATENT DOCUMENTS

| | | | |
|---|---|---|---|
| 5,440,730 | 8/1995 | Elmasri et al. | 707/203 |
| 5,446,901 | 8/1995 | Owick et al. | 711/154 |
| 5,499,365 | 3/1996 | Anderson et al. | 707/203 |
| 5,551,028 | 8/1996 | Voll et al. | 707/103 |
| 5,784,583 | 7/1998 | Redpath | 345/353 |
| 5,794,038 | 8/1998 | Stutz et al. | 395/683 |
| 5,809,506 | 9/1998 | Copeland | 707/103 |
| 5,864,866 | 1/1999 | Henckel et al. | 707/103 |
| 5,870,559 | 2/1999 | Leshem et al. | 395/200.54 |

OBJECT ORIENTED DISTRIBUTED PROGRAMMING SYSTEM FOR COMPUTER CONTROLLED NETWORKS WITH SELECTIVE CAPTURE OF PROGRAM PROPERTY DATA IDENTIFYING A PARTICULAR PROGRAM VERSION

CROSS-REFERENCE TO RELATED COPENDING PATENT APPLICATIONS

The following patent application which has the same inventorship as the present invention and is assigned to a common assignee covers subject matter related to the subject matter of the present invention: "AN OBJECT ORIENTED DISTRIBUTED PROGRAMMING SYSTEM WITH OBJECTS FOR DYNAMICALLY CONNECTING FUNCTIONING PROGRAMMING OBJECTS WITH OBJECTS FOR GENERAL PURPOSE OPERATIONS, K. LeBlanc et. al., of U.S. Ser. No. 08/951,937 filed Oct. 16, 1997.

TECHNICAL FIELD

The present invention relates to user-interactive object-oriented programming systems and particularly to such object-oriented programming systems which systems would be available to both programmers and interactive users in a networking environment such as the internet or equivalent proprietary or public networks.

BACKGROUND OF THE INVENTION

The 1990's decade has been marked by a societal technological revolution driven by the convergence of the data processing industry with the consumer electronics industry. Like all such revolutions, it unleased a gigantic ripple effect of technological waves. The effect has in turn driven technologies which have been known and available but relatively quiescent over the years. Two of these technologies are the internet-related distribution and object-oriented programming systems. Both of these technologies are embodied in the object-oriented Java Programming system. The computer and communications industries have extensively participating in the development and continual upgrading of the Java system. For details and background with respect to the Java system, reference may be made to a typical text, "Just Java", 2nd Edition, Peter van der Linden, Sun Microsystems, 1997. The convergence of the electronic entertainment and consumer industries with data processing exponentially accelerated the demand for wide ranging communications distribution channels and the World Wide Web or internet which had quietly existed for over a generation as an loose academic and government data distribution facility reached "critical mass" and commenced a period of phenomenal expansion which has not as yet abated.

With the expanded accessibility of tens of thousands of programmers to each other, not to mention to potential users of such programs via the expanded internet client base, an obvious need became apparent: cooperative programming systems wherein program developers could coact to continuously expand and enhance existing programs in a distributed programming environment. Also, users could readily obtain and apply these developed programs. Object-oriented programming which also had been virtually languishing for a generation offered the solution. With its potentially interchangeable objects or units within which both data attributes and functions were stored in a predefined uniform framework as well as the predefined object interfaces with each other, object-oriented programming systems have found acceptance as the programming system for the internet. In all areas of the data processing, communications as well as the electronic entertainment and consumer industries having anything to do with the internet, there has been a substantial movement to Java, the Sun Microsystems originated object-oriented programming system.

While the above described advantages of object-oriented programming with respect to the collective and cooperative programming are clear, there are potential disadvantages in a programming system where literally thousands of program developers and users are continually making changes in the programs dynamically. These changes could range in complexity from minor "cosmetic" changes to new program subroutines to new entire programs. Depending on the type and nature of the program, every addition, subtraction or modification of any object in a program could have an insignificant or a profound effect on the program. In effect, every one of such object changes produces a new version of the program. With an object-oriented programming system going full swing on the internet, there could be hundreds of thousands of potential of lesser or more significant changes to objects in any particular program or program group. Actually each change could be said to produce a new version of the program or routine. Thus, to keep track of every "version" in a program having an extensive history and contributor/ user base could be quite burdensome. On the other hand, the programming discipline is one in which traditionally programming changes intended for private or limited group use can become in widespread demand. In this connection, object oriented software componentry will permit more people to build software programs and routines and will shorten the software development cycle and make it more dynamic. Although the traditional software developers and administrators will continue to write the bulk of object oriented programs which are distributed and used over the internet, the individual users will also be developing their own custom software since the object oriented developmental tools will be more readily available over the internet and more easy to use. It follows that as software will be combined in new often unforeseen ways, there is an increased likelihood that the individual developments will drive many of the programs into inoperable states for certain purposes or under certain conditions. Here, the recording of program property data identifying the program versions where such potentially undesirable developments would be likely to occur could make it easier for program developers and users to recover from software modifications which did not operate as expected or which created problems with other related user software systems.

The present invention provides an implementation which selectively captures program property data identifying critical versions in network distributed object-oriented programming systems modification development without imposing a great burden on the system or its users.

SUMMARY OF THE INVENTION

The present invention relates to a computer controlled object oriented programming system having means for interfacing a plurality of programming objects with each other to provide combination objects combining programming functions of said objects in which each object includes predetermined interface data defining a required common interface with the other programming objects. A plurality of these objects, each have a framework comprising a plurality of data attributes and a method of manipulating said data attributes. These objects may be combined with each other via their common interfaces to form combination objects, and such combination objects may in turn be further combined with other objects and combination objects to form objects of increasing complexity which function as program versions. Means are provided for predefining critical combinations of programming functions after which program version data may be needed and for detecting when such critical combination occur. Further means are provided which in response to such a detection, record data representative of a program property which could be used to identify the programming version having the critical combination. This program property may be an alphanumeric or graphic identifier of the particular program version or the identifying program property could identify the author of the critical combination or it could take the form of a program annotation giving information regarding the program version.

The program property data identifying version is preferably recorded within the framework of the object having the critical combination of programming functions. If the system is a user interactive system means may be provided for interactively prompting a user for the version data.

As set forth hereinabove, the system of the present invention may be most advantageously applicable in networks using object oriented programming wherein a multitude of program contributors may be at a number of network terminals.

DETAILED DESCRIPTION OF THE PREFERRED EMBODIMENT

Before going into the details of specific embodiments, it will be helpful to understand from a more general perspective the various elements and method which may be used to implement the present invention. The present invention is implemented using the Java Programming system which is an object-oriented system utilizing the Java programming language. The Java system and language are extensively familiar to those skilled in the art. The text, "Just Java", Peter van der Linden, described above comprehensively details the system and language. Nonetheless, it should be helpful to generally review the known principles of object-oriented programming.

It should be understood by those skilled in the art that object oriented programming techniques involve the definition, creation, use and instruction of "objects". These objects are software entities comprising data elements or attributes and methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related methods are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes are typically called "frameworks" and essentially provide a prefabricated structure as a basis for creating a working application program.

In object oriented programming such as the previously described Java system, there is provided for the developer a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

A clarification of the term "framework" as used in object-oriented programming is in order. Frameworks are predefined structures for objects, combinations of objects which form more extensive objects and eventually combinations which provide whole programs.

Figure 1:
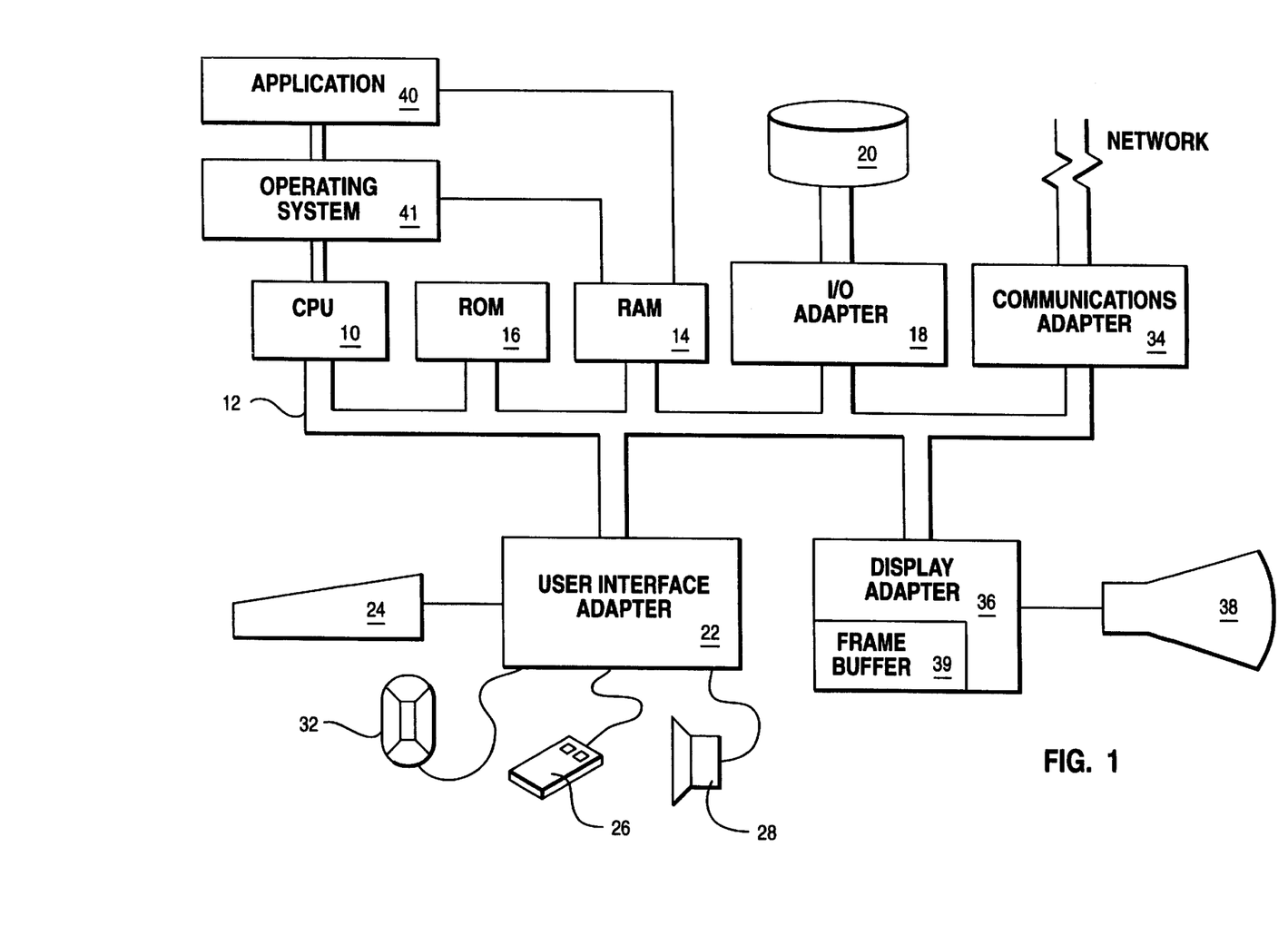
FIG. 1 is a block diagram of a data processing system including a central processing unit and network connections via a communications adapter which is capable of implementing the present invention.

Referring to FIG. 1, a typical data processing system is shown which may be used in conjunction with object oriented software such as Java (TM of Sun Microsystems Inc.) in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). An object oriented programming system such as Java 40 runs in conjunction with operating system 41 and provides output calls to the operating system 41 which implements the various functions to be performed by the application 40. The Java Programming System in combination with the operating system provides the basic platform with which, software developers will develop and end users will use the object oriented software of this invention.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the Java application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN) which includes of course the internet for which Java created. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

Since the present invention is implemented in the Java object oriented programming system, some initial comments concerning object oriented programming principles as embodied in Java should be appropriate. Since object oriented programming systems have been rapidly developing in recent years including systems and languages other than Java, there is still an absence of universality in the terminology which is being used in the art to describe various object oriented programming functions. It will be understood by those skilled in the art that other terms may have been used to describe the principles which we will discuss herein. As set forth in the above mentioned references, Java is a fully object oriented programming system which operates on a basic operating system such as Windows or OS/2. Java includes a wealth of frameworks, class libraries and a new programming environment intended to greatly enhance application software development, on the internet. It is intended to be fully portable between operating systems. There is a defined commonality between users factored into a set of services and frameworks. In Java, as in all highly sophisticated object oriented systems, writing an application program means creating a set of linked objects integrated into the Java/operating system platform. Software developers rely on this platform for both a sophisticated set of services and a framework to develop software. The frameworks provide powerful abstractions which permit software developers to concentrate on their problem rather that building up infrastructure. Furthermore the abstractions for the software developer are very close to the fundamental concepts that a user must understand to operate his software. All this makes the development of application easier.

An embodiment of the present invention will described which uses the "Java Bean" API (application programmer's interface). Java Bean is the most extensively used API in Java Programming. It is the tool which provides application developers with the framework for reusable, embeddable modular software components. The bean is the basic object unit; it can range from a simple individual component object to a extensive combination of objects providing a whole application program. Java Beans and their common properties and functions are described in detail in the text, "Java in a Nut Shell, 2nd. Edition by David Flanagan, published by O'Reilly and Assoc. Inc., California, 1997, particularly Chapter 10, pp. 178–189. The goal of the Java Bean Model is its commonality and interoperability with other Beans to form a combination component or Bean. Beans have defined common interfaces. Thus when beans are connectable via their common interfaces, the interfacing Beans may export to each other: 1) properties or attributes, 2) events and 3) methods. An attribute is a piece of the Bean's internal state which can be set and queried, usually through a standard pair of get and set accessor methods. A Bean may generate events through the triggering of a standard visible defined screen object such as a button. A Bean defines an event if it provides methods for adding or removing listener objects, for example, from a list of interested listeners for that event. Finally, the methods exported by the Bean are any public methods defined by the Bean, except for the Bean's own "housekeeping" methods which are used to get and set attribute values and to register and remove listeners in the above example.

We, thus, have a programming environment where a wide variety of Java Beans are available to a great many program developers as well as to an almost infinite number of users who now have the power to write their own or at least modify programming routines involving combinations of objects or Beans. Because of the internet setup giving rise to this type of object oriented distributive programming, most of the developments will not have sufficient data on program properties at a particular critical developmental or program modification stage to identify the program version. In addition, the defined requirements of Beans or other objects are complex enough without routinely requiring version information as part of the basic Bean definition. In fact, most programming developments resulting from the combination of Beans and the resulting export of functions and attributes between the combined Beans would not be enhanced by recording version information. Thus in the practice of the present invention, certain combination of programming functions and conditions which would be anticipated to require version information are predefined and when such combinations are detected, then means are provided for recording version information which may be any program property including authorship or any annotation which would serve to identify the program version.

In the description of a specific embodiment which will follow with respect to flowcharts, we will refer to combination of events and/or attribute changes which trigger the need and request for version data. For convenience in description, these will just be referred to as the predefined events or attribute changes without providing any real-life abstractions for such conditions. Thus, for the sake of completion in understanding, the following situations are offered in advance as examples of example of when the recording of programming version data may be needed. Network web sites or web pages generally require distributive programming contributions from many developers and users via a network such as the internet. In addition, such sites have users and developers who then link such web sites to other web sites. Reasonably, the version of the web site supporting program at the time when the site is linked to a particular other web site or page should be recorded since from that point on, changes in the original web site will be linked to the other related web page and there is the ongoing possibility that such change could give rise to incompatibilities or like problems in the linked page. In such a case, the programming version supporting the original page could be of help in honing in on and solving such problems.

Similarly, version recording triggering functions could have historical purposes. If a web page was about to be removed and thus disappear from the internet, any of the programming functions involved in the page removal could be the triggering function for the recording of the removed page programming support version.

The authorship of a particular modification could be a program property identifying the program version at that stage. Assume that several developers are linked on a network and are using Java Beans or some other object system in a joint project planning application. In such a project, it is conceivable that a substantial number os tasks must be jointly completed. As each task is completed, it may be important to record the individual who does the last combination of act which signify the completion of each task. The program can then accurately reflect the stage of completion of the overall project and accountability can be provided for each individual task.

As will be seen from the description hereinafter of the flowcharts, the means and method for detecting the conditions requiring version data capture and for recording such capture is included in a context programming layer which is an outer layer on the Bean. This context layer has the required Bean or object common interface which permits the layer to interface with the Bean in the Java system and also serves the common interface function when the Bean with the layer in turn interfaces with other Beans or with the Java/selected operating system platform. Thus the context layer would appear to be transparent when a Bean with layer interfaces with another object. In this sense the context layer may be considered to be an object which does not have the standard events and attribute handling of defined Beans but rather performs "housekeeping" or administrative-like functions for the system. Consequently, it may be referred to as a Java Bean Dip.

Figure 2:
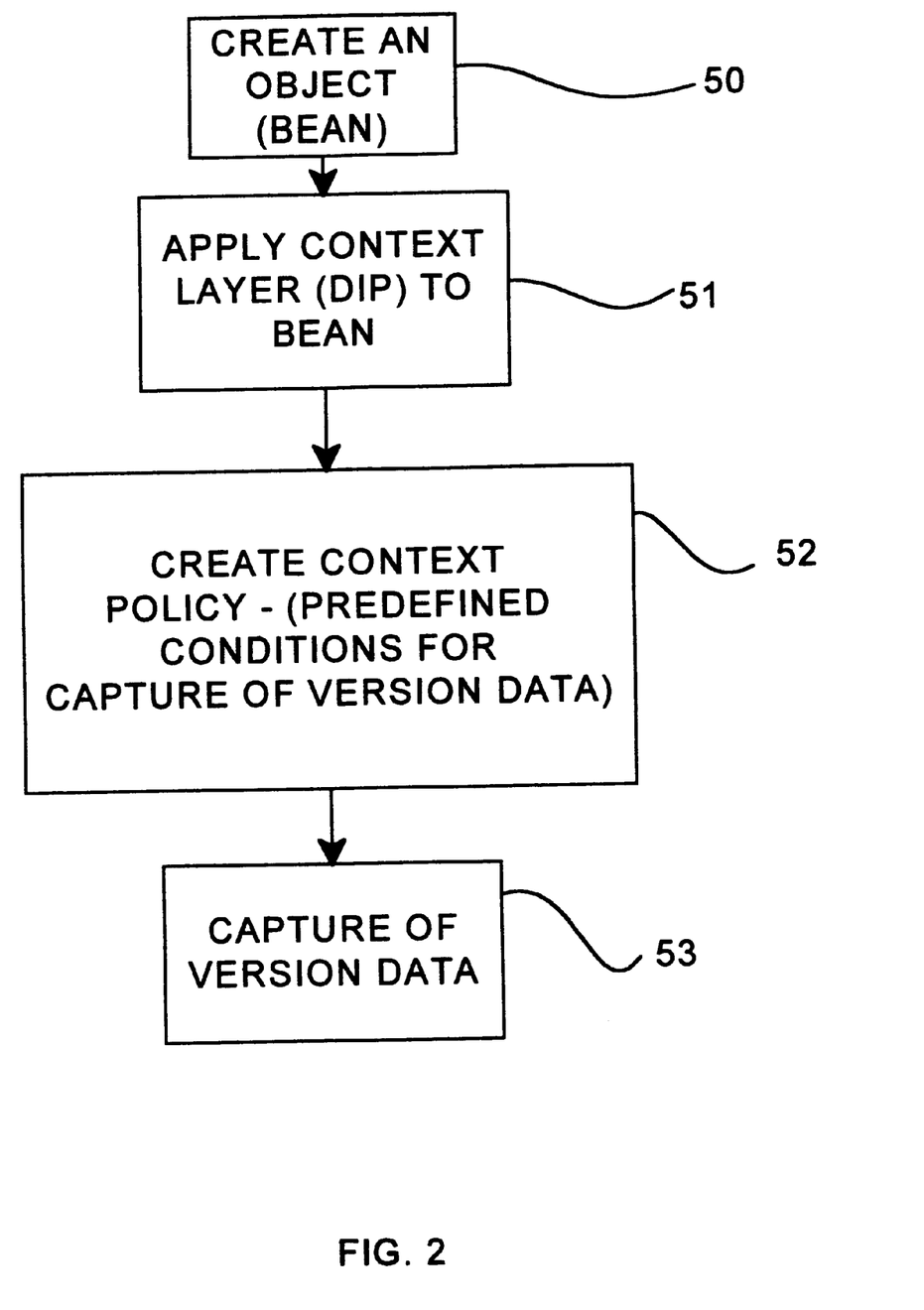
FIG. 2 is a high level flowchart of the major programming elements involved in the development of a program and in the running of the program in accordance with the present invention.

The present invention will now be described with respect to the flowcharts of FIGS. 2 through 5. In the example of the invention embodiment, Java Bean language, code and principles will be used. These are fully described in the previously referenced text, "Java in a Nutshell", David Flanagan. FIG. 2 is a chart showing the major elements in the present invention. Elements 50, 51 and 52 are in the development of the program while 53 involves the running of the program. Step 50: using Java Bean programming, an object is created. The Bean contains the events, attributes and methods required by the Bean definition in a predefined Bean framework with a Bean interface common to all Beans and thus combinable with other Beans via this common interface. When Beans combine with other Beans, they form combination beans which may be more complex than the original Beans but they fit the basic Bean definition and framework set forth above, even when the combination may be a whole routine or even a program.

Then, in stage 51, "Dips" or context program layers are applied to selected Beans at various levels in the combining of Beans to develop programs. While this context layer may have other functions, in the present invention, it is applied wherever program developers believe that it will be necessary to detect conditions requiring the recording of program properties which serve to identify the program version giving rise to such conditions. This context layer has the required Bean or object common interface which permits the layer to interface with the Bean in the Java system and also serves the common interface function when the Bean with the layer in turn interfaces with other Beans or with the Java/selected operating system platform. Thus the context layer would appear to be transparent when a Bean with layer interfaces with another object. In this sense the context layer may be considered to be an object which does not have the standard events and attribute handling of defined Beans but rather performs "housekeeping" or administrative-like functions for the system. An example of a sequence of the more significant programming statements for creating this context layer for author data capture follows. These statements need not be carried out in sequence. Terminology is from the Java Beans Package and particularly the java.beans.Event.SetDescriptor described in the above "Java in a Nutshell" text.

Apply Context Layer (Dip) to Bean
      createImplementation( ) (i.e.,set up communications with Bean)
      createEventFireListener( )
      createPropertyChangeListener( ) (i.e., attribute)—
      typeName( ) (i.e., version)

Figure 3:
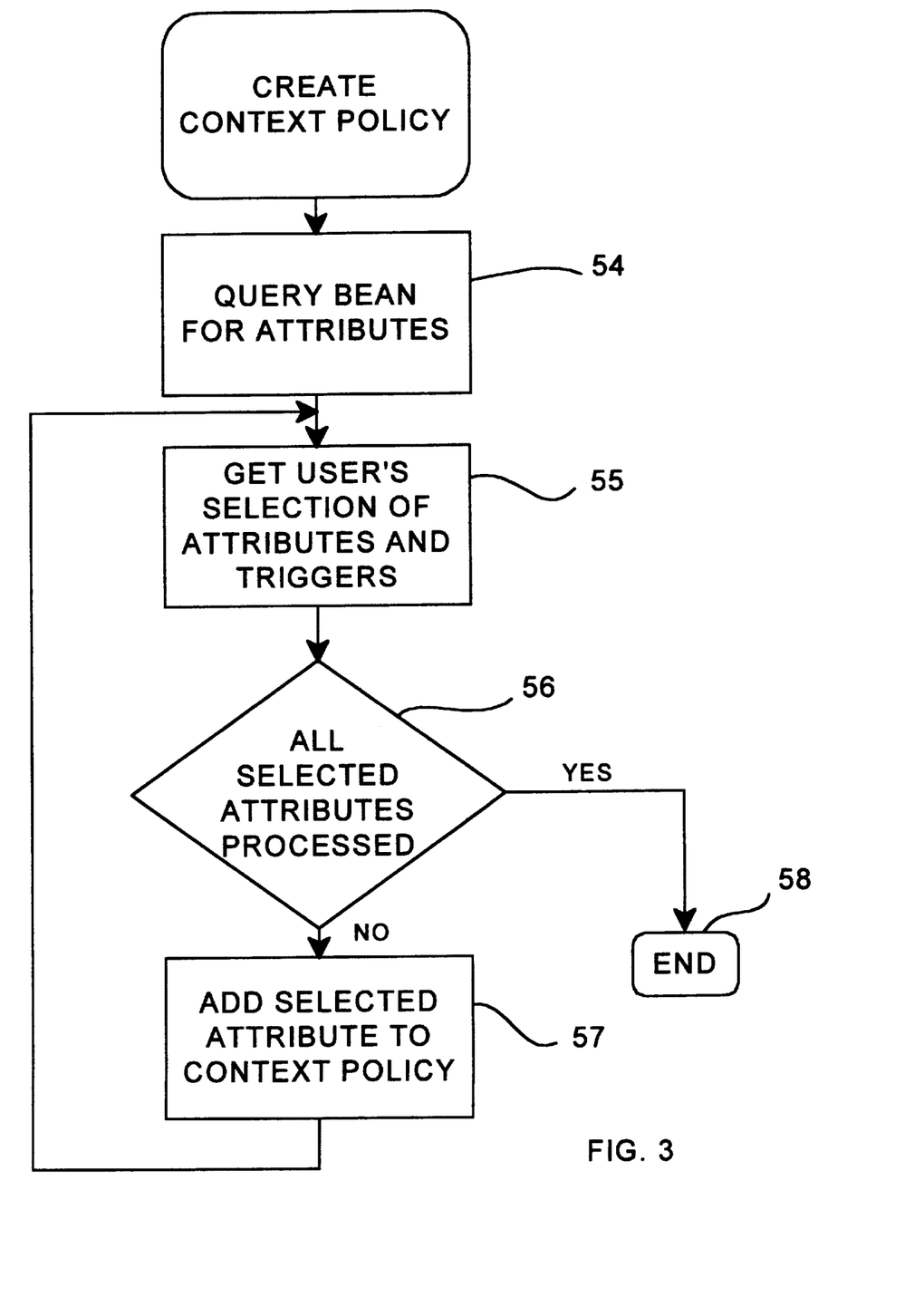
FIG. 3 is a flowchart of the major steps involved in the creation of the context policy referred to in FIG. 2.

Next, stage 52, a context policy, i.e. the predefined conditions which trigger the capture of version data is set up in the context layer. The development of this is shown in the flowchart of FIG. 3. The attributes of the Bean are determined, step 54. Since the eventual user of the program may be most familiar with and able to anticipate which combination of attributes or combination of events and attributes would present circumstances requiring the recording of version data, the developer should be incorporating the user's selections. At each attribute addition step, a determination is made, step 56 as to whether all user selected attributes have been processed. If they have been processed, the session ends, step 58. If the attributes have not been processed, then, step 57, the selected attributes are added to the version data recording context policy. An example of a sequence of the more significant programming statements for creating this context policy for version data capture follows. These statements need not be carried out in sequence.

Create Context Policy
getContextElement( )
setContextElement( )
getContextElementName( )
getUpdatePolicy( )
setUpdatePolicy( )
getVersion( )

At this stage, the example program routine for creating a context layer for version data capture has been completed and now stage 53, FIG. 2, the program routine is to be run by the user. This will be described with respect to the flowchart of FIG. 5. Simply stated, the program is set up to listen for the predetermined triggering events, step 70. At any point, there may a termination of the run. If there is such a signal, step 71, the session ends, step 76. Otherwise, the system continues to listen for triggering events, i.e., decision step 72, determines if a key attribute change has occurred. If no, the flow returns to step 70 and the listening continues. If such a change, has happened, the programs proceeds to increment the version number, i.e., the significant versions worthy of being recorded are numbered, step 73. Then, the programs proceeds to get the requisite version data, step 74. This may be done by interactively prompting the user if there is the customary user interface. In addition, some systems may be set up to then automatically get version data from their own data system files or from data banks accessible over networks such as the internet. This version data is then recorded in association with the bean, step 75. This may be conveniently recorded within the context layer or even in the bean itself. The program then returns to step 70 and the listening continues.

There will now be described a specific embodiment wherein the program property which serve to identify the version is author data which is to be captured. This will be described with respect to the flowchart of FIG. 4. Simply stated, the program is set up to listen for the predetermined triggering events, step 60. At any point, there may a termination of the run. If there is such a signal, step 61, the session ends, step 65. Otherwise, the system continues to listen for triggering events, i.e., decision step 62, determines if a key attribute change has occurred. If no, the flow returns to step 60 and the listening continues. If such a change, has happened, the programs proceeds to get the requisite author data, step 63. This may be done by interactively prompting the user if there is the customary user interface. In addition, some systems may be set up to then automatically get author data from their own data system files or from data banks accessible over networks such as the internet. This author data is then recorded in association with the bean, step 64.

Figure 4:
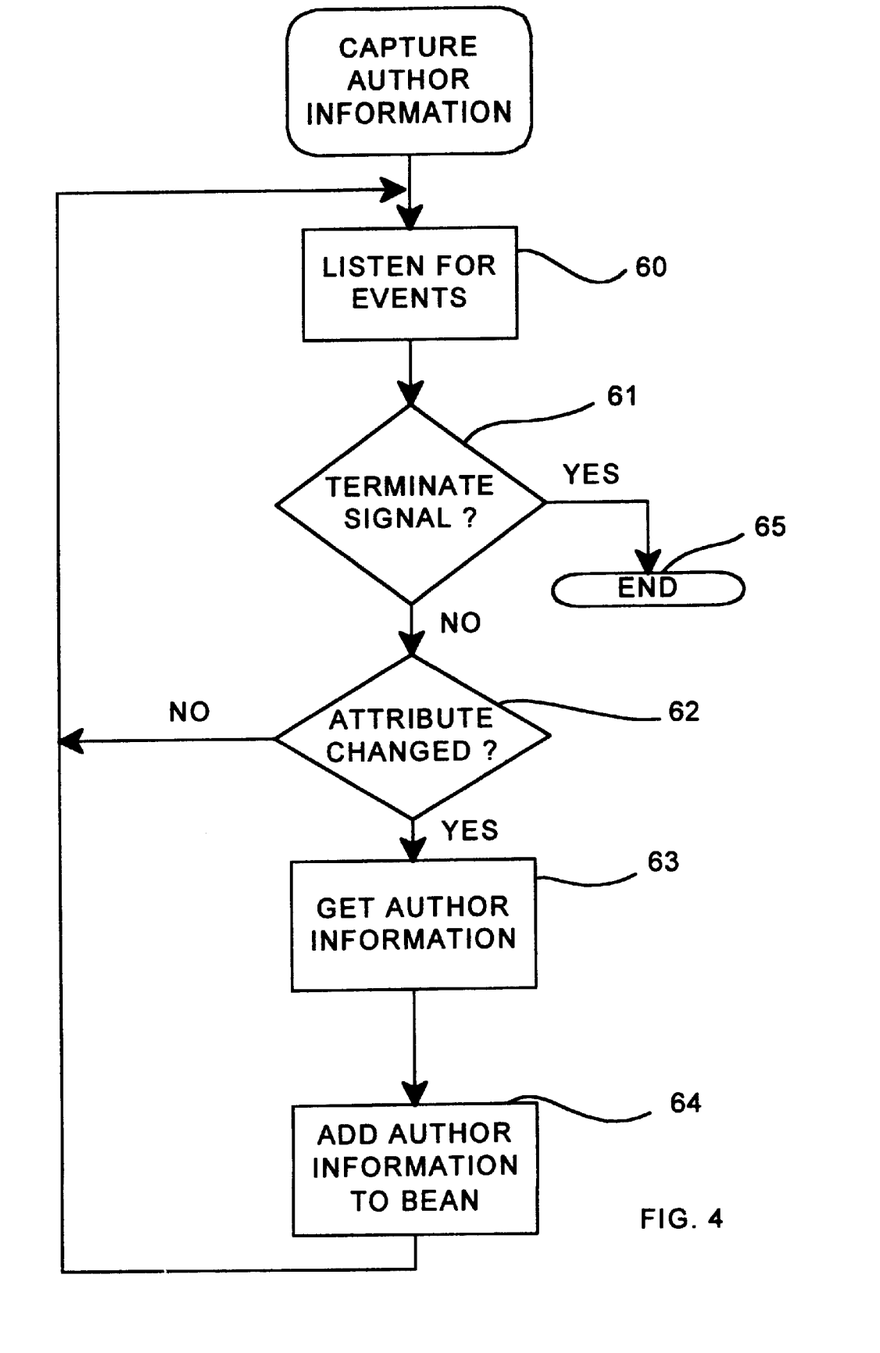
FIG. 4 is a flow chart of the major steps involved in running a program in accordance with the present invention to capture author data.
Figure 5:
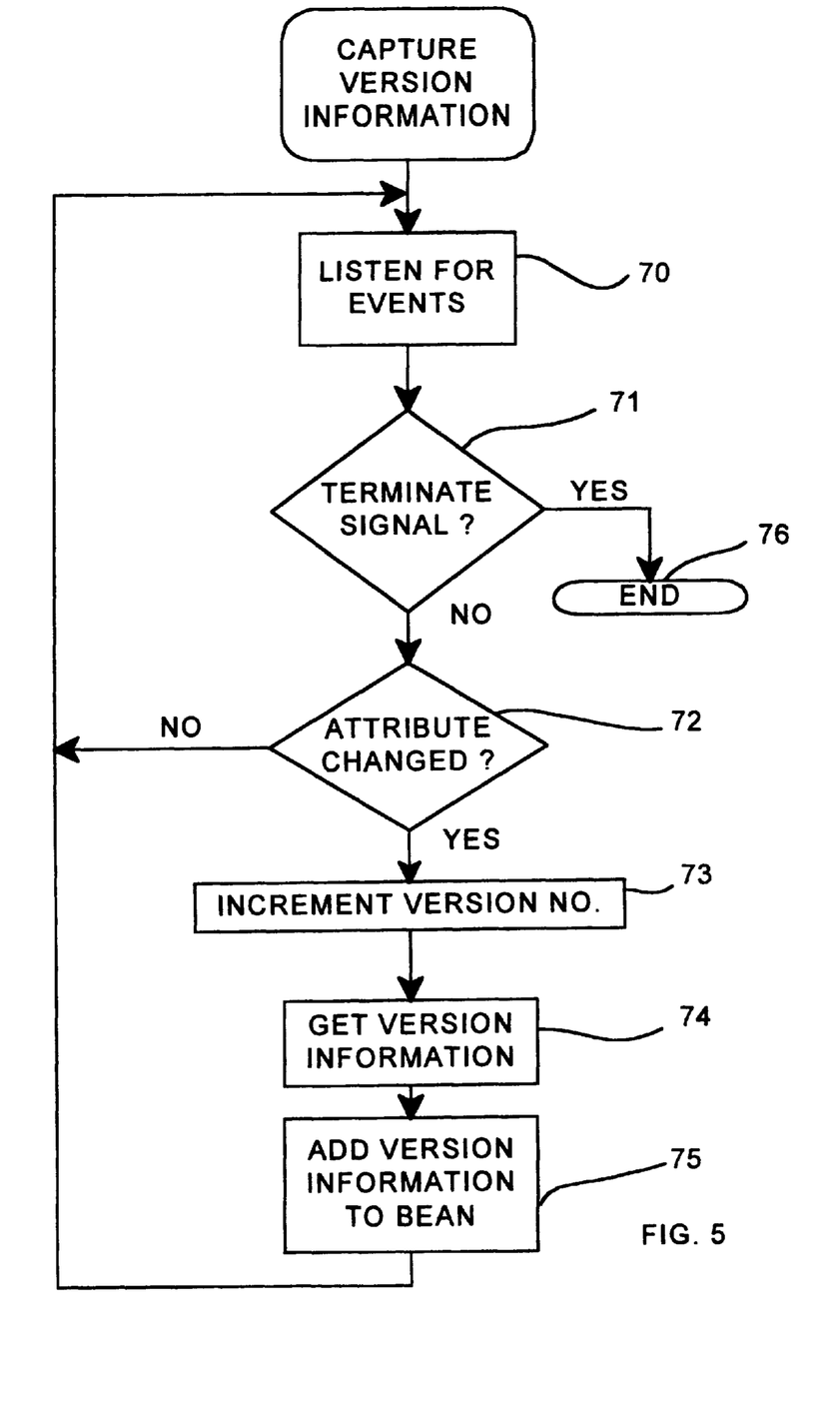
FIG. 5 is a flow chart of the major steps involved in running a program in accordance with the present invention to capture version data in general.

This may be conveniently recorded within the context layer or even in the bean itself. The program then returns to step 60 and the listening continues.

Although certain preferred embodiments have been shown and described, it will be understood that many changes and modifications may be made therein without departing from the scope and intent of the appended claims.

What is claimed is:

1. In a computer controlled object oriented programming system having means for interfacing a plurality of programming objects with each other to provide combination objects combining programming functions of said objects, each object and combination object respectively including predetermined interface data defining a required common interface with the other programming objects through which interface said objects and combination objects may be further combined to form objects of increasing complexity which function as program versions, the improvement wherein said system further comprises:

each of a plurality of said objects and combination objects respectively having a framework comprising a plurality of data attributes and a method of manipulating said data attributes, means for detecting the occurrence of predefined combined programming functions, and means responsive to said detecting means for automatically recording program property data identifying the program version having said detected combined programming functions.

2. The object oriented programming system of claim 1 wherein said program property data comprises the author of the version having said detected combined programming functions.

3. The object oriented programming system of claim 1 wherein said system is a user interactive system, and said means for recording data identifying the version interactively prompt the user for said version identifying data.

4. The object oriented programming system of claim 1 wherein said version identifying data is recorded within the framework of the combination object having the detected combined programming functions.

5. The object oriented programming system of claim 1 further including a program layer on at least one combination object, said program layer containing said means for detecting and said means for recording.

6. The object oriented programming system of claim 5 wherein said program layer further includes said predetermined interface data defining said required common interface with the other programming objects whereby said combination object may interface with other objects through said program layer.

7. A computer controlled user-interactive object-oriented programming system network comprising:

a database having a plurality of programming objects, each object including
a framework comprising a plurality of data attributes and a method of manipulating said data attributes, and
predetermined interface data defining a required common interface with the other programming objects, a plurality of user-interactive terminals, communication means for linking said terminals with said database, user-interactive means associated with said terminals for accessing and interfacing a plurality of said programming objects with each other to provide combination objects combining programming functions of said objects, said objects and combination objects being further combinable to form objects of increasing complexity which function as program versions, means for detecting the occurrence of predefined combined programming functions, and means responsive to said detecting means for automatically recording program property data identifying the program version having said detected combined programming functions.

8. The object oriented programming system network of claim 7 wherein said program property data comprises the author of the version having said detected combined programming functions.

9. The object oriented programming system network of claim 7 wherein said means for recording data identifying the version interactively prompt the user for said version data.

10. The object oriented programming system network of claim 7 wherein said version identifying data is recorded within the framework of the combination object having the detected combined programming functions.

11. The object oriented programming system network of claim 7 further including a program layer on at least one combination object, said program layer containing said means for detecting and said means for recording.

12. The object oriented programming system network of claim 11 wherein said program layer further includes said predetermined interface data defining said required common interface with the other programming objects whereby said combination object may interface with other objects through said program layer.

13. In a computer implemented method of object oriented programming including interfacing a plurality of programming objects with each other to provide combination objects combining programming functions of said objects, each object including predetermined interface data defining a required common interface with the other programming objects through which interface said objects and combination objects may be further combined to form objects of increasing complexity which function as program versions, the improvement wherein said method further comprises:

storing in association with each of a plurality of such objects, a framework comprising a plurality of data attributes and a method of manipulating said data attributes, detecting the occurrence of predefined combined programming functions, and responsive to the detection of said occurrence, automatically recording program property data identifying the programming version having said detected combined programming functions.

14. The method of claim 13 wherein said program property data comprises the author of the version having said detected combined programming functions.

15. The method of claim 13 wherein said method is user interactive, and said user is interactively prompted for said version identifying data in said recording step.

16. The method of claim 13 wherein said author data is recorded within the framework of the combination object having the detected combined programming functions.

17. The method of claim 13 further including the step of forming a program layer on at least one combination object, said program layer performing said detecting step and said recording step responsive to said detecting step.

18. The method of claim 17 wherein said program layer further includes said predetermined interface data defining said required common interface with the other programming objects whereby said combination object may interface with other objects through said program layer.

19. In a computer controlled user-interactive object-oriented programming system network comprising:

a database having a plurality of programming objects, each object including
a framework comprising a plurality of data attributes and a method of manipulating said data attributes, and
predetermined interface data defining a required common interface with the other programming objects;

a plurality of user-interactive terminals;

communication means for linking said terminals with said database;

user-interactive means associated with said terminals for accessing and interfacing a plurality of said programming objects with each other to provide combination objects combining programming functions of said objects and user-interactive means for further interfacing said objects and combination objects to form objects of increasing complexity which function as program versions;

a method of selective recording of program property data identifying the program version comprising:
storing selected predefined combined programming functions,
detecting the occurrence of said predefined combined programming functions, and
automatically recording program property data identifying the programming version having said detected combined programming functions in response to said detection.

20. the method of claim 19 wherein said program property data comprises the author of the version having said detected combined programming functions.

21. The method of claim 19 wherein said user is interactively prompted for programming version data in said recording step.

22. The method of claim 19 wherein said programming version identifying data is recorded within the framework of the combination object having the detected combined programming functions.

23. The method of claim 19 further including the step of forming a program layer on at least one combination object, said program layer performing said detecting step and said recording step responsive to said detecting step.

24. The method of claim 23 wherein said program layer further includes said predetermined interface data defining said required common interface with the other programming objects whereby said combination object may interface with other objects through said program layer.

25. In a computer program having data structures included on a computer readable medium comprising an object oriented programming system having means for interfacing a plurality of programming objects with each other to provide combination objects combining programming functions of said objects, each object and combination object respectively including predetermined interface data defining a required common interface with the other programming objects through which interface said objects and combination objects may be further combined to form objects of increasing complexity which function as program versions, the improvement wherein said system further comprises:

each of a plurality of said objects and combination objects respectively having a framework comprising a plurality of data attributes and a method of manipulating said data attributes, means for detecting the occurrence of predefined combined programming functions, and means responsive to said detecting means for automatically recording program property data identifying the program version having said detected combined programming functions.

26. The computer program according to claim 25 wherein said program property data comprises the author of the version having said detected combined programming functions.

27. The computer program according to claim 25 wherein said system is a user interactive system, and said means for recording data identifying the version interactively prompt the user for said version data.

28. The computer program according to claim 25 wherein said version identifying data is recorded within the framework of the combination object having the detected combined programming functions.

29. The computer program according to claim 25 further including a program layer on at least one combination object, said program layer containing said means for detecting and said means responsive to said detecting means.

30. The computer program according to claim 29 wherein said program layer further includes said predetermined interface data defining said required common interface with the other programming objects whereby said combination object may interface with other objects through said program layer.

* * * * *